US009349167B2

(12) United States Patent
Matsumoto (10) Patent No.: US 9,349,167 B2
(45) Date of Patent: May 24, 2016

(54) IMAGE PROCESSING METHOD AND IMAGE PROCESSING APPARATUS (71) Applicant: PANASONIC CORPORATION, Osaka (JP)

(72) Inventor: Kentaro Matsumoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 151 days.

(21) Appl. No.: 14/466,389

(22) Filed: Aug. 22, 2014

(65) Prior Publication Data

US 2015/0063726 A1    Mar. 5, 2015

(30) Foreign Application Priority Data

Aug. 28, 2013 (JP) ................. 2013-176455
Jul. 31, 2014 (JP) ................. 2014-156844

(51) Int. Cl.
G06T 5/00 (2006.01)

(52) U.S. Cl.
CPC ....... *G06T 5/008* (2013.01); *G06T 2207/20016* (2013.01)

(58) Field of Classification Search
None
See application file for complete search history.

(56) References Cited

U.S. PATENT DOCUMENTS

| 5,365,277 | A   | * | 11/1994 | Greggain ............ H04N 5/14 348/571 |
| 7,773,158 | B2  |   | 8/2010  | Yamashita et al. |
| 7,880,814 | B2  |   | 2/2011  | Yamashita et al. |
| 7,881,550 | B2  |   | 2/2011  | Ito et al. |
| 7,903,898 | B2  |   | 3/2011  | Ito et al. |
| 8,228,417 | B1  | * | 7/2012  | Georgiev ............ G03B 11/00 348/335 |
| 8,368,814 | B2  |   | 2/2013  | Yamashita et al. |
| 8,401,324 | B2  |   | 3/2013  | Ito et al. |
| 2007/0080975 | A1 |   | 4/2007  | Yamashita et al. |
| 2007/0286519 | A1 | * | 12/2007 | Friedrich ............ G06T 5/20 382/260 |
| 2009/0128834 | A1 | * | 5/2009  | Matsuhira ............ G06T 5/008 358/1.2 |
| 2010/0014773 | A1 |   | 1/2010  | Ito et al. |
| 2010/0073502 | A1 | * | 3/2010  | An .................... G06T 7/204 348/222.1 |
| 2010/0157115 | A1 |   | 6/2010  | Yamashita et al. |
| 2010/0188523 | A1 |   | 7/2010  | Ito et al. |
| 2010/0215286 | A1 | * | 8/2010  | Takahashi ............ G06T 3/4053 382/274 |
| 2011/0025890 | A1 |   | 2/2011  | Yamashita et al. |
| 2011/0096179 | A1 | * | 4/2011  | Border ............ H04N 5/23267 348/208.4 |

(Continued)

FOREIGN PATENT DOCUMENTS

| JP | 2007-180851 A | 7/2007 |
| JP | 2007-312349 A | 11/2007 |

(Continued)

*Primary Examiner* — Michelle Entezari (74) *Attorney, Agent, or Firm* — McDermott Will & Emery LLP (57) ABSTRACT An image processing method includes: (a) reducing an original image to a reduced image; (b) generating a first correction value for each of pixels in the reduced image; (c) generating a second correction value for each of pixels in an intermediate image, using information on the pixel and the first correction value; (d) generating a third correction value for each of pixels in the original image, using the second correction value for the pixel in the intermediate image; and (e) correcting the original image, using the third correction value for each of the pixels in the original image. In step (d), the third correction value is generated with an amount of calculation for each of the pixels in the original image smaller than an amount of calculation for each of the pixels in the intermediate image in generating the second correction value.

10 Claims, 7 Drawing Sheets

(56) References Cited

U.S. PATENT DOCUMENTS

| | | |
|---|---|---|
| 2011/0122148 A1 | 5/2011 | Ito et al. |
| 2011/0255004 A1* | 10/2011 | Tran ............... H04N 5/145 348/699 |
| 2013/0243101 A1* | 9/2013 | Reibman ............ G06F 11/0766 375/240.25 |
| 2014/0153823 A1* | 6/2014 | Lee ............... G06T 3/4015 382/167 |

FOREIGN PATENT DOCUMENTS

| | | |
|---|---|---|
| JP | 2007-316630 A | 12/2007 |
| JP | 2010-016479 A | 1/2010 |

* cited by examiner

IMAGE PROCESSING METHOD AND IMAGE PROCESSING APPARATUS

CROSS REFERENCE TO RELATED APPLICATION

The present application is based on and claims priority of Japanese Patent Application No. 2013-176455 filed on Aug. 28, 2013, and of Japanese Patent Application No. 2014-156844 filed on Jul. 31, 2014. The entire disclosure of the above-identified applications, including the specifications drawings and claims are incorporated herein by reference in their entirety.

FIELD

The present disclosure relates to an image processing method for correcting an original image.

BACKGROUND

Patent Literature 1 (PTL 1) discloses a visual processing apparatus. In the visual processing apparatus, a first gain signal having a predetermined gain characteristic with respect to an image signal is outputted by a visual processing unit, and, based on the first gain signal, the visual processing apparatus corrects the image signal inputted thereto. Hence, the visual processing apparatus implements a high correction-processing capability in a simple structure.

CITATION LIST

Patent Literature

Japanese Unexamined Patent Application Publication No. 2007-312349

SUMMARY

Technical Problem

The present disclosure provides an image processing method which is capable of both reducing processing amount and curbing image deterioration.

Solution to Problem

An image processing method according to the present disclosure is for correcting an original image. The image processing method includes: (a) reducing the original image to a reduced image having fewer pixels than the original image; (b) generating a first correction value for each of pixels in the reduced image, using a pixel value of the pixel in the reduced image and a pixel value of a surrounding pixel located around the pixel in the reduced image; (c) generating a second correction value for each of pixels in an intermediate image having more pixels than the reduced image and having fewer pixels than the original image, using information on the pixel in the intermediate image, information on a corresponding pixel included in the reduced image and corresponding to the pixel in the intermediate image, and the first correction value of the corresponding pixel; (d) generating a third correction value for each of pixels in the original image, using the second correction value for the pixel in the intermediate image; and (e) correcting the original image, using the third correction value for each of the pixels in the original image, wherein, in step (d), the third correction value is generated with an amount of calculation for each of the pixels in the original image smaller than an amount of calculation for each of the pixels in the intermediate image in generating the second correction value.

Advantageous Effects

An image processing method according to the present disclosure is capable of both reducing processing amount and curving image deterioration.

BRIEF DESCRIPTION OF DRAWINGS

These and other objects, advantages and features of the invention will become apparent from the following description thereof taken in conjunction with the accompanying drawings that illustrate a specific embodiment of the present invention.

DESCRIPTION OF EMBODIMENT

Hereinafter, an embodiment is described in detail, with reference to the drawings as necessary. It is noted that unnecessary details may be omitted. Examples of details to be omitted include a detailed description of a well-known matter and an overlapping description of the same structure. This is to keep the description below from becoming redundant more than necessary, and to facilitate understanding of persons skilled in the art.

It is noted that the inventor provides the attached drawings and the description below in order for persons skilled in the art to thoroughly understand the present disclosure, and does not intend to limit the subject matter of claims with the drawings and the description.

Embodiment

Described hereinafter is an embodiment, with reference to FIGS. 1 to 7.

Figure 1:
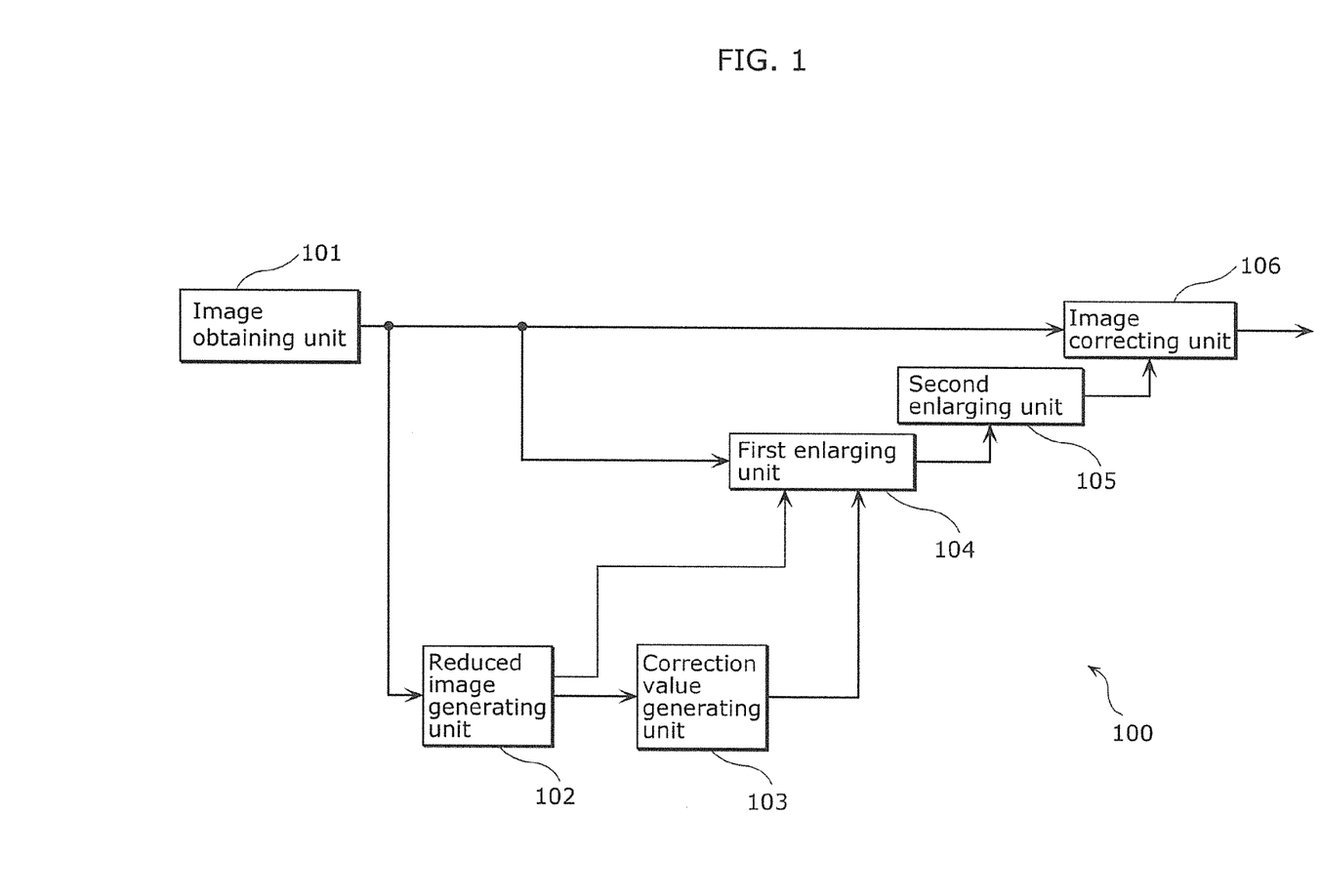
FIG. 1 represents a block diagram illustrating a specific example of an image processing apparatus according to an embodiment.

FIG. 1 represents a block diagram illustrating a specific example of an image processing apparatus according to the embodiment. An image processing apparatus 100 in FIG. 1 includes an image obtaining unit 101, a reduced image generating unit 102, a correction value generating unit 103, a first enlarging unit 104, a second enlarging unit 105, and an image correcting unit 106.

The image obtaining unit 101 obtains an original image from a recording medium connected to the image processing apparatus 100. The original image may be either a picture included in a video stream or a still image. Hereinafter, for the sake of explanation, an original image to be processed is a picture included in a video stream.

Specifically, the image obtaining unit 101 obtains, as the original image, a single picture included in an inputted video stream and found at any given time. It is noted that the video stream may be decoded either by the image processing apparatus 100 or by an external apparatus. In the latter case, the image obtaining unit 101 obtains a decoded video stream.

The reduced image generating unit 102 is a reducing unit to reduce an image. For example, the reduced image generating unit 102 reduces the number of pixels in the original image obtained by the image obtaining unit 101 to generate a reduced image.

Specifically, the reduced image generating unit 102 generates a reduced image having no aliasing, by low-pass filtering and sub-sampling the original image. In the case where an original image has pixels of 1920×1080, the reduced image generating unit 102 horizontally and vertically reduces the number of pixels to one eighth of those in the original image, and generates a reduced image having pixels of 240×135.

It is noted that, in generating a reduced image, the reduced image generating unit 102 may generate either a reduced image having the same aspect ratio as the original image has or a reduced image whose aspect ratio is different from that of the original. In other words, the reduced image generating unit 102 reduces the number of pixels in an original image; however, a designer of the image processing apparatus 100 is free to set the number of pixels in and the aspect ratio of a reduced image.

Then the reduced image generating unit 102 outputs the reduced image, which is obtained by reducing the original image, to the correction value generating unit 103 and the first enlarging unit 104.

The above description exemplifies filtering as a technique for generating a reduced image; instead, the reduced image generating unit 102 may obtain (calculate) the average value of multiple pixel values for the original image and corresponding to a single pixel after the reduction, and may generate the average value as a pixel value of the reduced image.

The correction value generating unit 103 generates a correction value. Specifically, for each of the pixels in the reduced image, the correction value generating unit 103 generates a correction value corresponding to the pixel in the reduced image, based on a pixel value of the pixel in the reduced image and pixel values of other pixels surrounding the pixel.

The correction value generated by the correction value generating unit 103 is used for correcting a pixel value of a pixel included in the original image and corresponding to a pixel in the reduced image. The correction value may be regarded as a value for correcting a pixel value of a pixel in the reduced image. Furthermore, the correction value may be referred to as gain. In addition, multiple correction values, each associated with one of pixels in an image, fit the image and are referred to as gain map. Such multiple correction values may also be referred to as correction map, correction matrix, or correction data.

Figure 2:
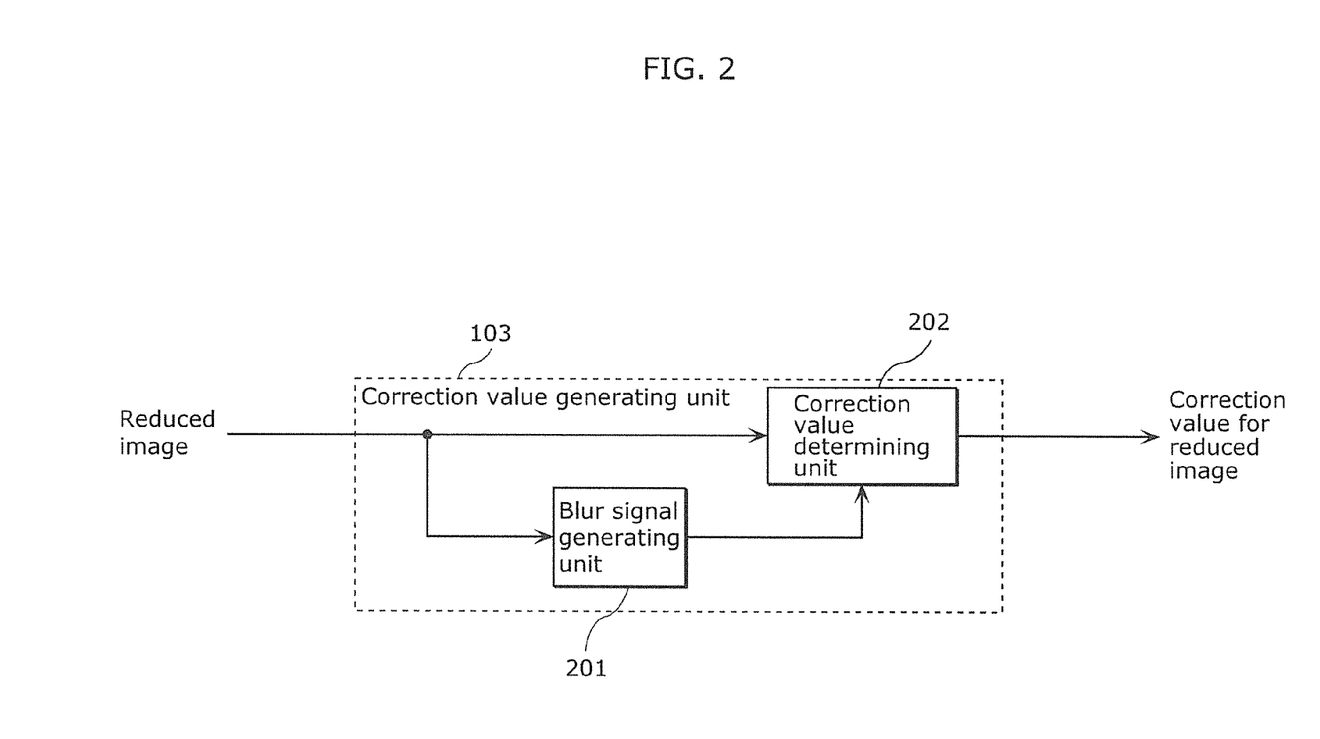
FIG. 2 represents a block diagram illustrating a specific example of a correction value generating unit according to the embodiment.

FIG. 2 represents a block diagram illustrating a specific example of the correction value generating unit 103 in FIG. 1. FIG. 2 specifically illustrates how the correction value generating unit 103 generates a correction value from a reduced image to be inputted thereto. As represented in FIG. 2, for example, the correction value generating unit 103 includes a blur signal generating unit 201 and a correction value determining unit 202.

For each of the pixels in a reduced image, the blur signal generating unit 201 generates a blur signal by combining a pixel value of the pixel in the reduced image and pixel values of multiple pixels surrounding the pixel. The blur signal includes information indicating luminosity of a target pixel and its surroundings (in other words, average brightness of the target pixel and its surroundings).

Here exemplary surroundings cover an area of one or the predetermined number of pixels. The multiple pixels surrounding the target pixel may be adjacent to the target pixel. Here, in generating the blur signal, the pixel value of the target pixel is used; instead, only the pixel values of the pixels surrounding the target pixel may be used. Moreover, here, the center of a pixel represents the location of the pixel; instead, a position such as the top-left corner of the pixel may represent the location of the pixel.

Specifically, the blur signal generating unit 201 filters pixel values (for example, luminance values) of the target pixel and the pixels surrounding the target pixels, using a two-dimensional low-pass filter or a one-dimensional low-pass filter. Then the blur signal generating unit 201 outputs, to the correction value determining unit 202, a blur signal generated through the filtering.

The correction value determining unit 202 generates a correction value, based on a pixel value for the reduced image and the blur signal inputted from the blur signal generating unit 201. Here the correction value determining unit 202 generates as many correction values as the number of pixels in the reduced image.

Specifically, the correction value determining unit 202 generates the correction values, using a two-dimensional lookup table (LUT). Here the two-dimensional LUT is used for determining the correction value, based on a pixel value for the reduced image and a blur signal. The two-dimensional LUT defines a correction value corresponding to a pixel value of the reduced image and a blur signal.

For example, the two-dimensional LUT includes multiple tables each indicating a corresponding relationship between multiple pixel values and multiple correction values. The correction value determining unit 202 selects a table from among the multiple tables, using a blur signal inputted by the blur signal generating unit 201. Then, with reference to the selected table, the correction value determining unit 202 determines to generate a correction value corresponding to a pixel value for the reduced image. It is noted that, based on the pixel value for the reduced image and the blur signal, a function may be used for the two-dimensional LUT in order to determine the correction value.

In addition, for example, the correction value determining unit 202 generates a correction value for darkness correction. The darkness correction is a technique to increase the brightness in darker regions (darker areas), an equivalent of which is seen as a visual characteristic of humans. The visual characteristic of a human involuntarily converts information which enters the eyes. The two-dimensional LUT used by the correction value determining unit 202 briefly represents a conversion characteristic which emulates a visual characteristic referred to as, in particular, brightness contrast or chromatic contrast.

Specifically, a human recognizes that lightness he or she perceives is low when the object is in a bright setting and high when the object is in a dark setting, no matter how the level of the lightness is the same. Such a visual characteristic is referred to as brightness contrast. In order to improve subjective image quality, the correction value determining unit 202 generates a correction value which corresponds to such a visual characteristic. In particular, in order to curb elimination of contrast caused by correction, the correction value determining unit 202 generates the correction value, using a blur signal on which pixel values of surrounding pixels are reflected. This makes it possible to generate an appropriate correction value, and curb elimination of contrast.

Based on the correction value generated by the correction value generating unit 103, the first enlarging unit 104 generates a correction value for each of the pixels included in an intermediate image which has more pixels than a reduced image and fewer pixels than the original image. By generating a correction value for each of the pixels in the intermediate image, from a correction value for each of the pixels in the reduced image, the first enlarging unit 104 increases the correction value, for the pixel in the reduced image, to the correction value for the pixel in the intermediate image. Here increasing the correction values is not to increase the correction values in value, but to increase the correction values in number.

In other words, by generating a gain map of the intermediate image from a gain map of the reduced image, the first enlarging unit 104 enlarges the gain map of the reduced image to the gain map of the intermediate image. In other words, the first enlarging unit 104 expands correction values each corresponding to one of pixels included in the reduced image into correction values each corresponding one of pixels in the intermediate image. A specific operation executed by the first enlarging unit 104 shall be described later.

The second enlarging unit 105 generates, from the correction value for each of the pixels in the intermediate image, a correction value for each of pixels in the original image. By generating a correction value for each of the pixels in the original image, from a correction value for each of the pixels in the intermediate image, the second enlarging unit 105 increases the correction value, for the pixel in the intermediate image, to the correction value for the pixel in the original image.

Specifically, for example, the second enlarging unit 105 increases the correction value, using bilinear interpolation (linear interpolation). In addition, as another technique, the second enlarging unit 105 increases the correction value, using nearest-neighbor interpolation. Furthermore, as another technique, the second enlarging unit 105 increases the correction value, using bicubic interpolation.

Here, when the first enlarging unit 104 is compared with the second enlarging unit 105 in processing amount per pixel in the increasing, the second enlarging unit 105 is greater in the processing amount. In other words, the image processing apparatus 100 increases correction values in the decreasing order of a processing amount per pixel.

More pixels cause a greater processing amount in total for generating correction values each for one of the pixels. Hence the image processing apparatus 100 executes (i) complex processing, for fewer pixels, which is great in processing amount per pixel and high in accuracy, and (ii) simple processing, for more pixels, which is small in processing amount per pixel and low in accuracy. Thus, in generating the correction value for each of the pixels in the original image, the image processing apparatus 100 can achieve both reducing the processing amount and curbing possible image deterioration due to the reduction of the processing amount. Here the processing amount corresponds to an amount of calculation.

The image correcting unit 106 corrects pixel values for the original image, using the correction values each generated for one of the pixels in the original image. The image correcting unit 106 corrects the original image through correcting the pixel values for the original image, and generates a corrected image.

Specifically, the image correcting unit 106 multiplies a pixel value ($X_{in}$) for the original image by a correction value (g) which is gain, and generates a corrected pixel value ($X_{out}$) in order to generate a corrected image.

$$X_{out} = gX_{in} \quad \text{(Expression 1)}$$

More specifically, the image correcting unit 106 corrects each component of RGB values which represent pixel values for the original image. In another technique, the image correcting unit 106 may correct each component of YUV values which represent pixel values for the original image.

[Details of First Enlarging Unit 104]

Described hereinafter is a specific operation of the first enlarging unit 104, with reference to the drawings.

Figure 3:
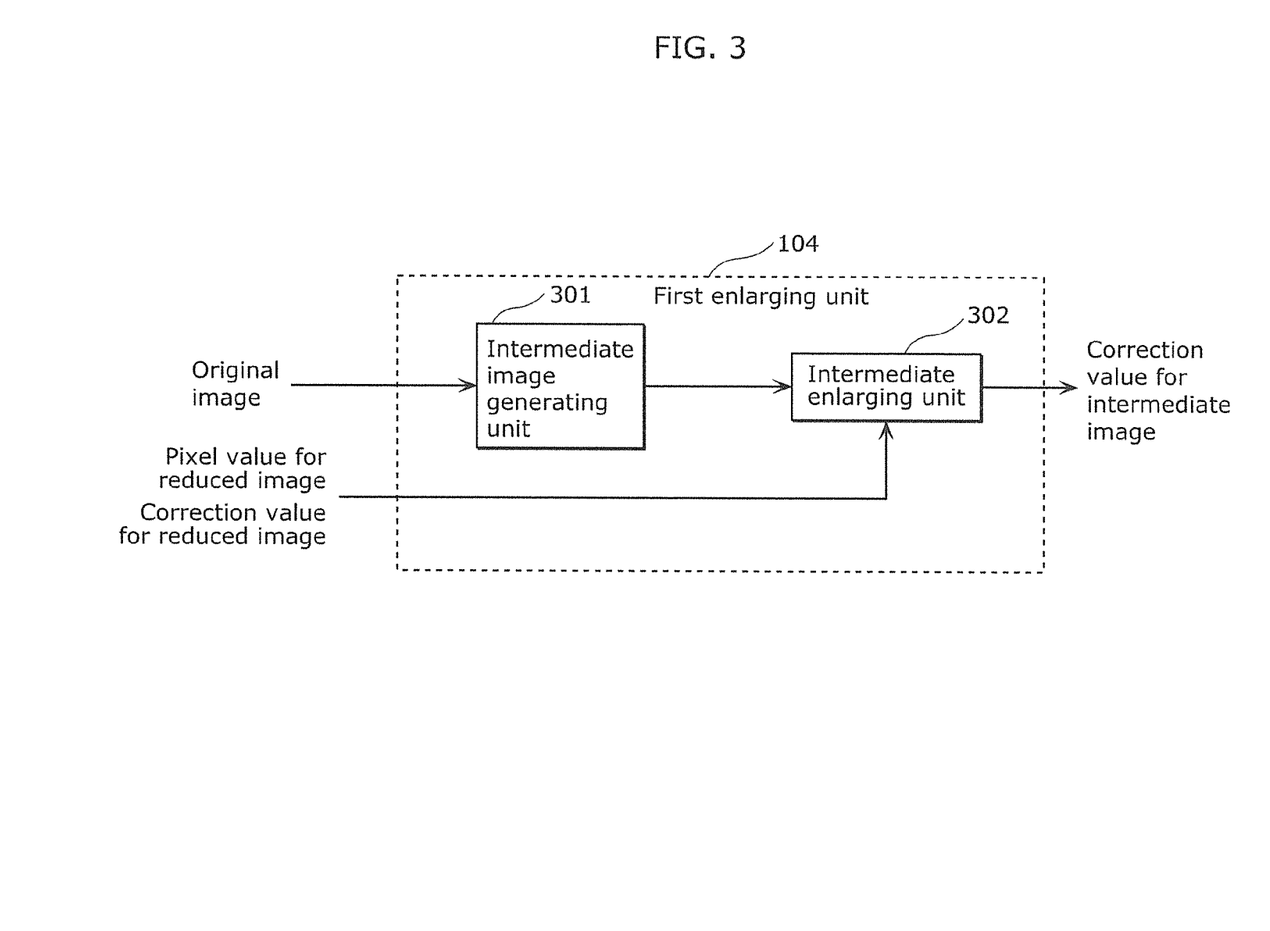
FIG. 3 represents a block diagram illustrating a specific example of a first enlarging unit according to the embodiment.

FIG. 3 represents a block diagram illustrating a specific example of the first enlarging unit 104 in FIG. 1.

As represented in FIG. 3, the first enlarging unit 104 includes an intermediate image generating unit 301 and an intermediate enlarging unit 302.

The intermediate image generating unit 301 reduces the original image and generates an intermediate image which is greater in the number of pixels than a reduced image.

Specifically, the intermediate image generating unit 301 reduces the original image as small as the intermediate image. Here the intermediate image includes as many pixels as the correction values generated by the intermediate enlarging unit 302 through the increasing processing executed on the correction values each generated for one of the pixels in the reduced image. In other words, the intermediate image generating unit 301 reduces the resolution of the original image to that of the intermediate image. When the intermediate enlarging unit 302 outputs a correction value for each of the pixels of 480×270, for example, the intermediate image generating unit 301 reduces the original image to an intermediate image having pixels of 480×270.

For each of the pixels in the intermediate image generated by the intermediate image generating unit 301, the intermediate enlarging unit 302 generates a new correction value, using information on the pixel, information on a corresponding pixel (hereinafter also referred to as a reference pixel) included in the reduced image and corresponding to the pixel in the intermediate image, and a correction value of the corresponding pixel. Hence the intermediate enlarging unit 302 increases the correction value for each of the pixels in the reduced image to the correction value for each of the pixels in the intermediate image.

Described hereinafter is the increasing processing executed by the intermediate enlarging unit 302, with reference to FIG. 4.

Figure 4:
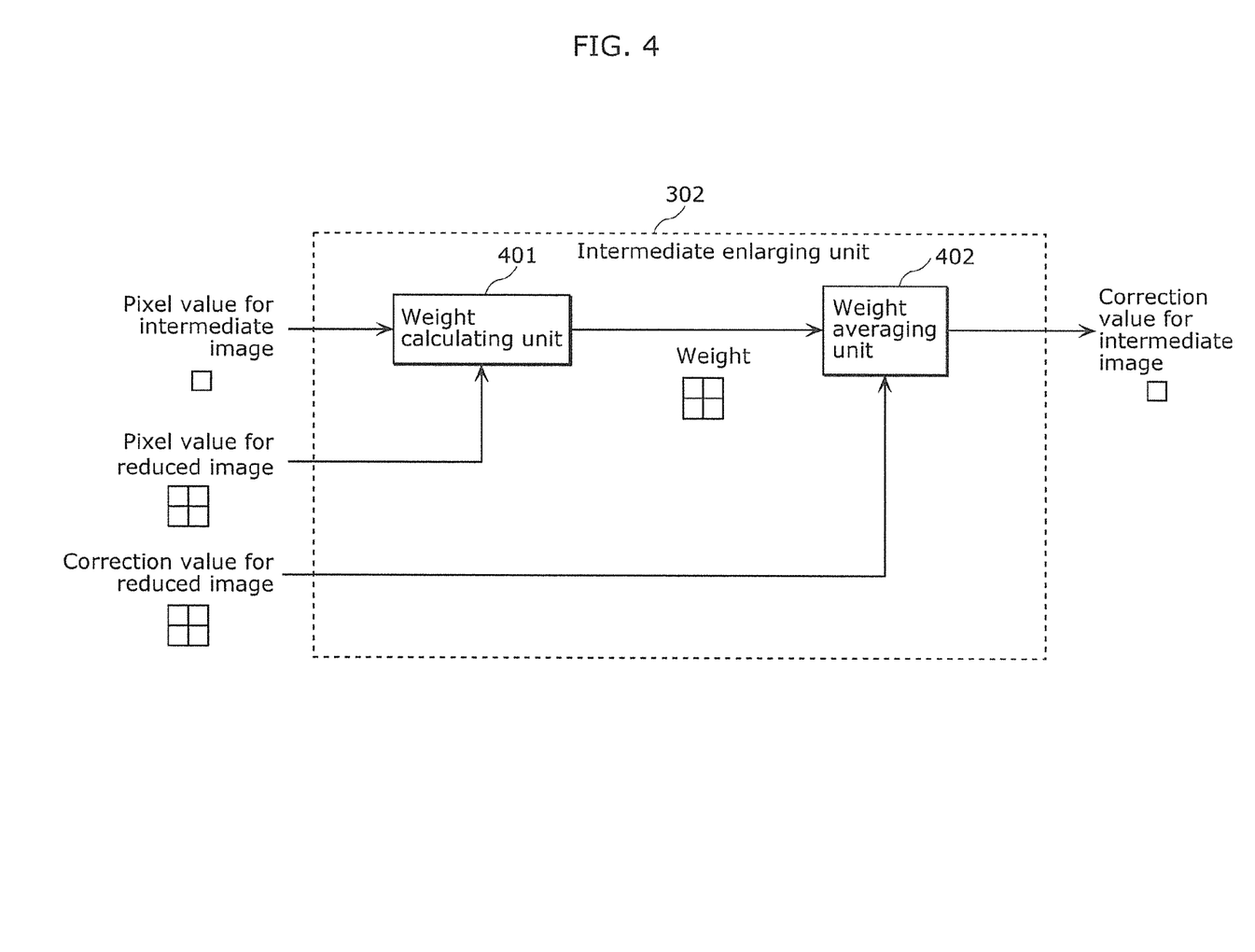
FIG. 4 represents a block diagram illustrating a specific example of an intermediate enlarging unit according to the embodiment.

FIG. 4 represents a block diagram illustrating a specific example of the intermediate enlarging unit 302 represented in FIG. 3. FIG. 4 illustrates how the intermediate enlarging unit 302 executes increasing processing.

Described hereinafter is specific processing to be executed on the intermediate enlarging unit 302, with reference to FIGS. 4 and 5. For the sake of explanation, the intermediate enlarging unit 302 here refers to information on four pixels of 2×2 included in a reduced image when generating a correction value of one pixel in an intermediate image generated by the intermediate image generating unit 301. The four pixels of 2×2 are corresponding pixels (reference pixels) each corresponding to one of the pixels in the intermediate image. The four pixels include a pixel at a position co-located with a position of a corresponding one of the pixels in the intermediate image or pixels surrounding the co-located position.

The intermediate enlarging unit 302 includes a weight calculating unit 401 and a weight averaging unit 402.

The weight calculating unit 401 obtains (i) from the intermediate image generating unit 301, a pixel value of one pixel in the intermediate image, and (ii) from the reduced image generating unit 102, four pixel values of 2×2 in the reduced image. Then the weight calculating unit 401 compares the pixel value of the one pixel in the intermediate image with each of the four pixel values of 2×2 in the reduced image. Here a pixel n represents the one pixel in the intermediate image, and a pixel $m_0$, a pixel $m_1$, a pixel $m_2$, and a pixel $m_3$ each represent a different one of the pixels of 2×2 in the reduced image.

When generating a correction value of the pixel n in the intermediate image, the intermediate enlarging unit 302 refers to information on the pixels $m_0$, $m_1$, $m_2$, and $m_3$ in the reduced image.

Figure 5:
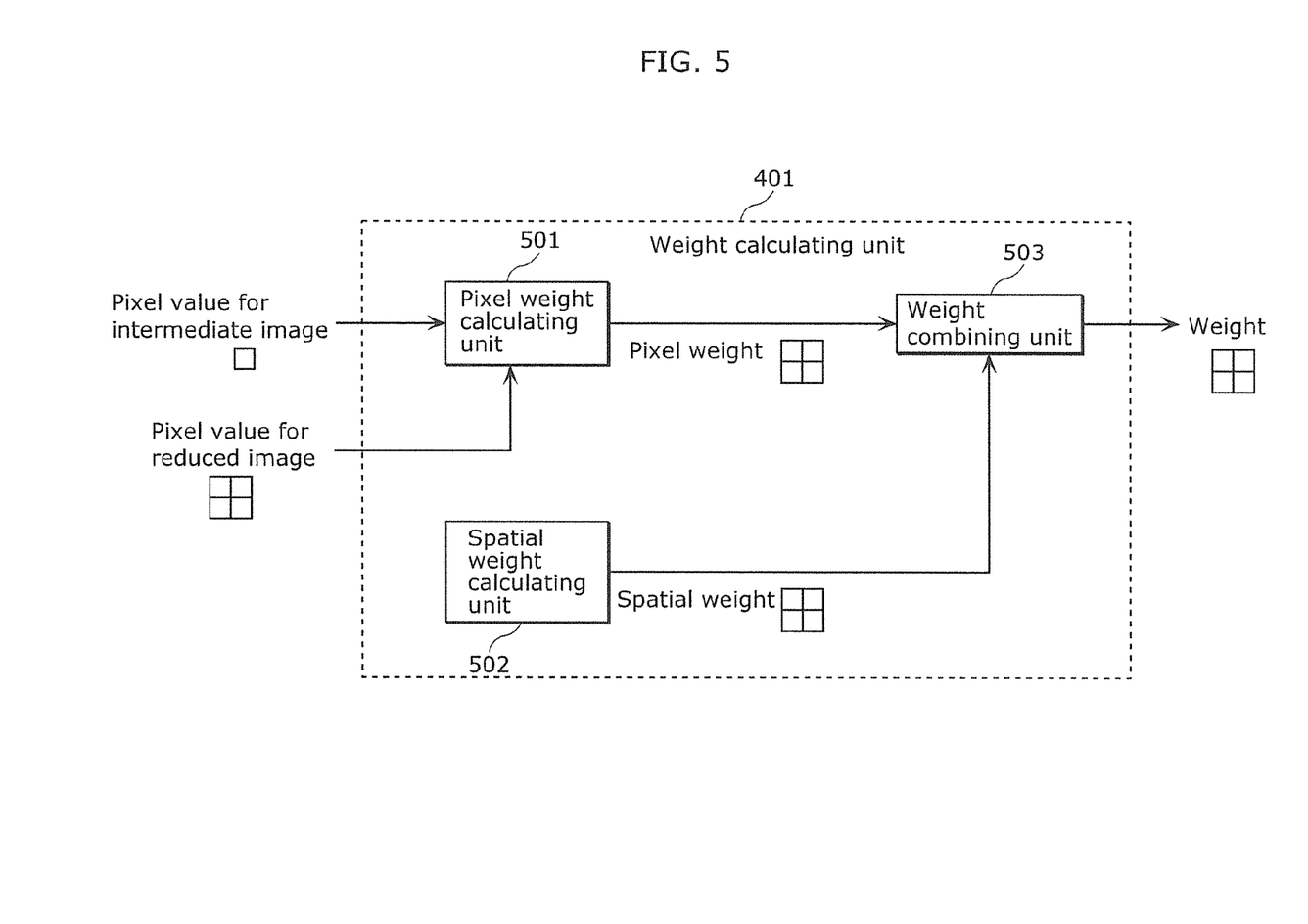
FIG. 5 represents a block diagram illustrating a specific example of a weight calculating unit according to the embodiment.

FIG. 5 represents a block diagram illustrating a specific example of the weight calculating unit 401. FIG. 5 exemplifies how the weight calculating unit 401 calculates a weight. The weight calculating unit 401 in FIG. 5 includes a pixel weight calculating unit 501, a spatial weight calculating unit 502, and a weight combining unit 503. The weight calculating unit 401 compares the pixel n in the intermediate image with each of the four pixels $m_0$, $m_1$, $m_2$, and $m_3$ in the reduced image, and calculates weights each corresponding to one of the four pixels $m_0$, $m_1$, $m_2$, and $m_3$.

The pixel weight calculating unit 501 compares the pixel n with each of pixel values of the four pixels $m_0$, $m_1$, $m_2$, and $m_3$, and calculates (i) a heavier weight (pixel weight) if the compared two pixel values are closer to each other and (ii) a lighter weight if the two pixel values are farther to each other. Specifically, the pixel weight calculating unit 501 calculates a pixel weight using Expression 2.

$$W_p(k) = W_{max} - ABS(X(n) - X(m_k)) \quad \text{(Expression 2)}$$

Here, $X(n)$ represents the pixel value of the pixel n. $X(m_k)$ represents the pixel value of the pixel $m_k$ (0≤k≤3). $W_p(k)$ represents the pixel weight of the pixel $m_k$. $W_{max}$ is any given value to be set so that the pixel weight does not become negative. ABS(X) represents the absolute value of X. The pixel weight calculating unit 501 calculates a pixel weight using Expression 2 so that the calculated pixel weight $W_p(k)$ is (i) heavier if the pixel value of the pixel $m_k$ is closer to that of the pixel n, and (ii) lighter if the pixel value of the pixel $m_k$ is farther to that of the pixel n.

The pixel weight calculating unit 501 may calculate a pixel weight, using Expression 3 as another pixel weight calculating technique. Expression 3 corresponds to a Gaussian function, and a represents a variance.

[Math. 1]

$$W_p(k) = \frac{1}{2\pi\sigma^2} \exp\left(-\frac{(X(n) - X(m_k))^2}{2\sigma^2}\right) \quad \text{(Expression 3)}$$

Next the spatial weight calculating unit 502 calculates a weight according to a spatial distance between the pixel n in the intermediate image and the pixel $m_k$ in the reduced image (0≤k≤3). Here the weight calculated according to a spatial distance is lighter as the spatial distance is greater. For example, the spatial weight calculating unit 502 calculates a weight (spatial weight) using Expression 4.

$$W_s(k) = (1-\alpha(k)) \times (1-\beta(k)) \quad \text{(Expression 4)}$$

In Expression 4, the size of one pixel represents 1. $\alpha(k)$ represents a distance in a horizontal direction between (i) a relative position of the center, of the pixel n, with respect to the intermediate image and (ii) a relative position of the center, of the pixel $m_k$, with respect to the reduced image. $\beta(k)$ represents a distance in a vertical direction between (i) a relative position of the center, of the pixel n, with respect to the intermediate image and (ii) a relative position of the center, of the pixel $m_k$, with respect to the reduced image. $W_s(k)$ represents a spatial weight of the pixel $m_k$.

The spatial weight calculating unit 502 calculates a smaller spatial weight as a spatial distance is greater. The technique for the spatial weight calculating unit 502 to calculate a spatial weight shall not be limited to the above one.

Then the weight combining unit 503 combines the pixel weight $W_p(k)$ calculated by the pixel weight calculating unit 501 with the spatial weight $W_s(k)$ calculated by the spatial weight calculating unit 502, and obtains the final weight corresponding to the pixel $m_k$.

For example, the weight combining unit 503 multiplies the pixel weight $W_p(k)$ and the spatial weight $W_s(k)$ to obtain a weight corresponding to the pixel $m_k$.

As another weight combining technique, the weight combining unit 503 may also add the pixel weight $W_p(k)$ and the spatial weight $W_s(k)$ to obtain a weight corresponding to the pixel $m_k$.

Based on the above, the weight calculating unit 401 calculates, for each pixel in the intermediate image, four weights of the four reference pixels in the reduced image. Hence the weight calculating unit 401 calculates as many weights as the product of the number of pixels in the intermediate image and the number of reference pixels.

In other words, the weight calculating unit 401 calculates four weights per pixel in the intermediate image. When the weight averaging unit 402 outputs correction values for pixels of 480×270, for example, the weight calculating unit 401 calculates weights for pixels of 480×270×4. Then the weight calculating unit 401 outputs calculated weights to the weight averaging unit 402.

Based on the weights calculated by the weight calculating unit 401, the weight averaging unit 402 weight-averages correction values. Specifically, the weight averaging unit 402 weight-averages four correction values each corresponding to one of the pixels of 2×2 in the reduced image, and calculates a correction value corresponding to one of the pixels in the intermediate image. Then the weight averaging unit 402 calculates a correction value for each of the pixels in the intermediate image, and outputs the calculated correction value.

It is noted that, in the above operation, the reference pixels are of 2×2; instead, the reference pixels may be increased in number to correspond to pixels of 4×4 or 8×8. The image processing apparatus 100 can gradually change increased correction values more spatially, using more reference pixels; however, this inevitably increases a processing amount per pixel to be processed.

When the reference pixels are increased in number in order for the image processing apparatus 100 to increase as well as intensely smooth the correction values, the processing amount increases. Hence the image processing apparatus 100 may divide the increasing processing into two. Specifically, the image processing apparatus 100 first refers to pixels of 4×4 and second refers to pixels of 2×2. Hence the image processing apparatus 100 can curb an increase in processing amount and execute intense smoothing.

It is noted that the intermediate enlarging unit 302 may analyze a spatial change of pixel values for an intermediate image. Then the intermediate enlarging unit 302 may increase a correction value for each of the pixels in a reduced image, so that the correction value gradually changes spatially along a direction in which the pixel value for the intermediate image gradually changes spatially. In addition, the intermediate enlarging unit 302 may increase the correction value for each of the pixels in the reduced image, so that the correction value steeply changes spatially in a direction in which the pixel value for the intermediate image steeply changes spatially.

[Modification of First Enlarging Unit 104]

Figure 6:
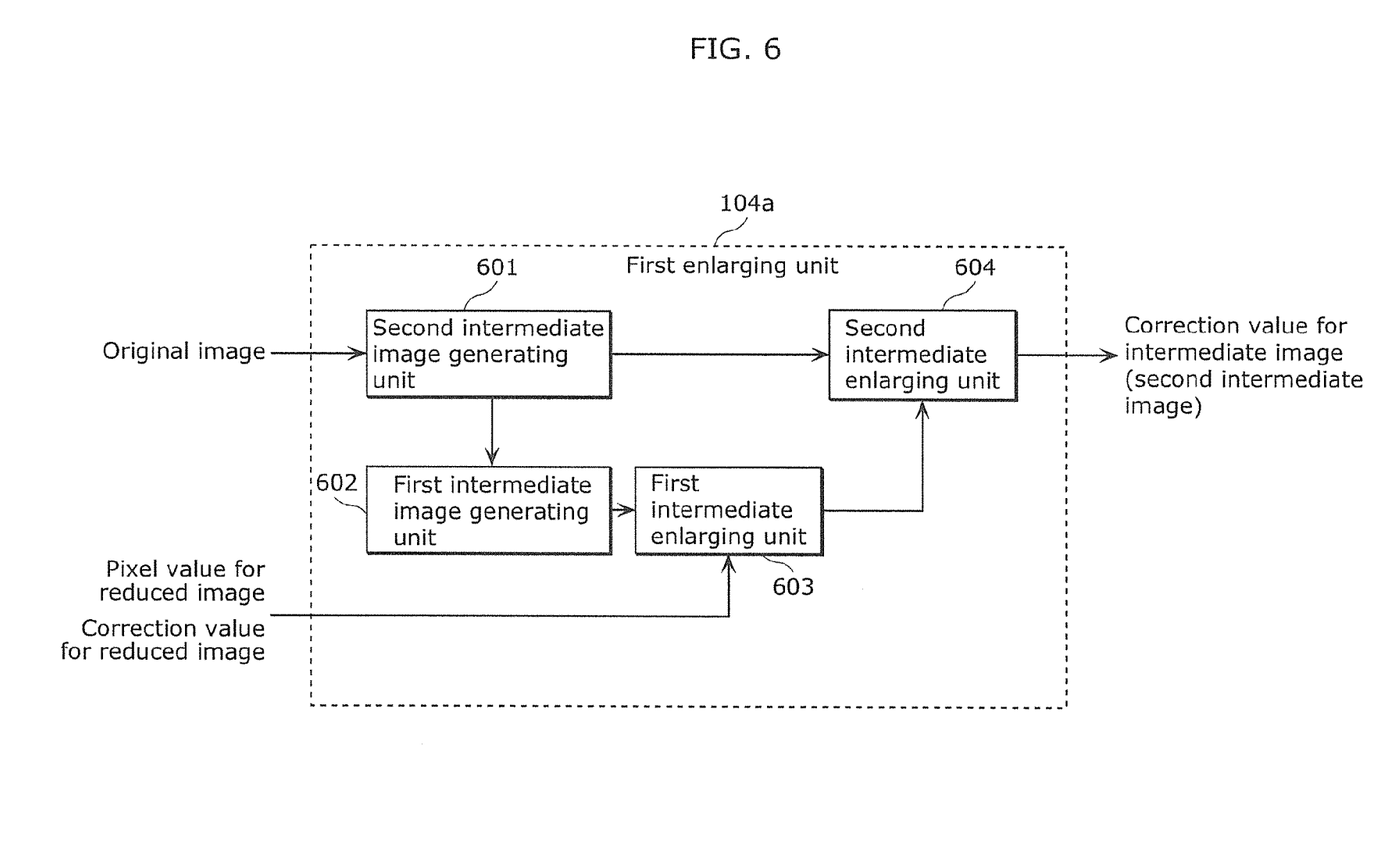
FIG. 6 represents a block diagram illustrating a modification of the first enlarging unit according to the embodiment.

Instead of the above structure, the first enlarging unit 104 may be modified to have another structure so that, as illustrated in FIG. 6, a correction value for each of the pixels in a reduced image may be increased twice.

FIG. 6 represents a block diagram illustrating a modification of the first enlarging unit 104 in FIG. 1. In FIG. 6, a modification of the first enlarging unit 104 is illustrated as a first enlarging unit 104a. The first enlarging unit 104a divides increasing processing into two. Instead of the first enlarging unit 104 in FIG. 3, the image processing apparatus 100 represented in FIG. 1 may include the first enlarging unit 104a in FIG. 6.

In this modification, the first enlarging unit 104a generates a correction value for each of the pixels in an intermediate image by increasing twice the correction value for each of the pixels in the reduced image. Here, in the first enlarging unit 104a, the processing amount per pixel in the second increasing is smaller than or equal to the processing amount per pixel in the first increasing.

In FIG. 6, a second intermediate image generating unit 601 generates, based on an original image, a second intermediate image having as many pixels as correction values to be outputted by a second intermediate enlarging unit 604 for the original image. Moreover, a first intermediate image generating unit 602 generates, based on the second intermediate image, a first intermediate image having as many pixels as correction values to be outputted by a first intermediate enlarging unit 603 for the original image.

Similar to the intermediate enlarging unit 302, the first intermediate enlarging unit 603 generates a correction value for each of the pixels in the first intermediate image by increasing, based on the first intermediate image, a correction value for each of the pixels in a reduced image. Similar to the intermediate enlarging unit 302, the second intermediate enlarging unit 604 generates a correction value for each of the pixels in the second intermediate image by increasing, based on the second intermediate image, a correction value for each of the pixels in the first intermediate image. Using pixels of 4×4 as reference pixels, the first intermediate enlarging unit 603 executes more intense smoothing. The second intermediate enlarging unit 604 may execute simple increasing processing.

The correction values from the first enlarging unit 104a—that is, the correction values each generated by the second intermediate enlarging unit 604 for one of the pixels in the second intermediate image—are equivalent to the correction values each generated for one of the pixels in an intermediate image by the intermediate enlarging unit 302 in the first enlarging unit 104. Similar to the correction values outputted from the first enlarging unit 104, the second enlarging unit 105 can use correction values outputted from the first enlarging unit 104a.

In the above, the first enlarging unit 104a executes the increasing processing twice. The first enlarging unit 104a may also generate a correction value for each of pixels in the intermediate image by executing, on the correction value for the pixel in the reduced image, n iterations of the increasing processing (where n is an integer greater than or equal to 2). Then, the first enlarging unit 104a may execute n iterations of the increasing processing, so that a processing amount for each of the pixels in the mth (where m is an integer greater than or equal to 2 and smaller than or equal to n) increasing processing is smaller than a processing amount for each of the pixels in the m-1th increasing processing.

For example, the reference pixels in the m-1th increasing processing may be fewer than the reference pixels in the mth increasing processing. In other words, the first enlarging unit 104a may execute the mth increasing, using information on reference pixels fewer than those in the m-1th increasing. Moreover, for example, the first enlarging unit 104a may execute the m-1th increasing using the pixel values of the reference pixels and the mth increasing without the pixel values of the reference pixels.

In addition, instead of the first enlarging unit 104 and the second enlarging unit 105, the image processing apparatus 100 may include the first enlarging unit 104a. In other words, the first enlarging unit 104 and the second enlarging unit 105 may be replaced with a single first enlarging unit 104a.

In this case, for example, the first enlarging unit 104a generates a correction value for each of the pixels in the original image by increasing n times (where n is an integer greater than or equal to 2) the correction value for the pixel in the reduced image. Then the first enlarging unit 104a may execute increasing n times. In the n-time increasing, the processing amount per pixel in the mth increasing (m is an integer smaller than or equal to n and greater than or equal to 2) is smaller than the processing amount per pixel in the m-1th increasing. Changed in structure as described above, the image processing apparatus 100 can reduce processing amount and curb deterioration in image quality.

[Operation of the Image Processing Apparatus 100]

Described hereinafter again is the operation described above, with reference to FIG. 7. In other word, the above operation will be described again for review.

Figure 7:
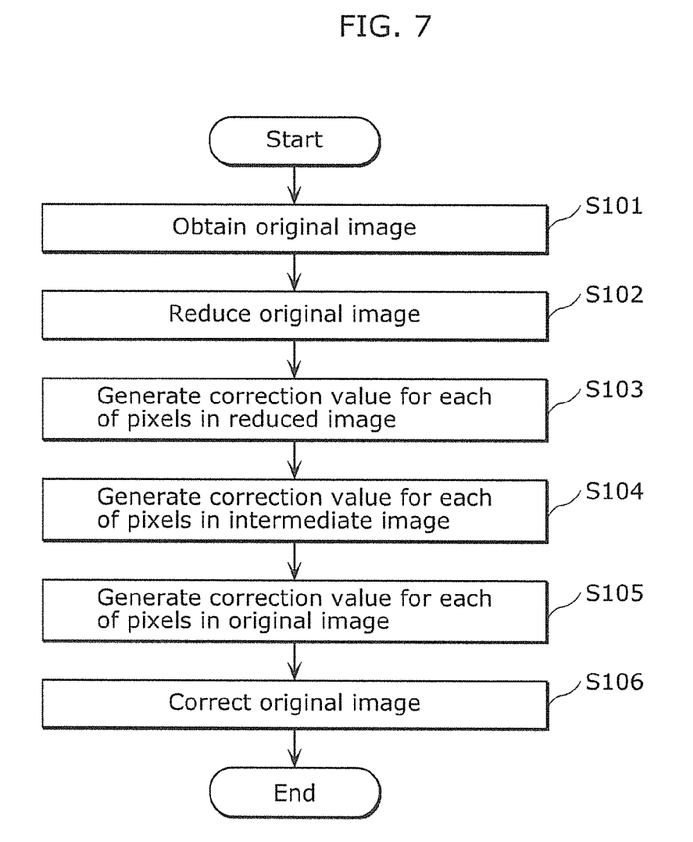
FIG. 7 represents a flowchart illustrating an exemplary operation of an image processing apparatus according to an embodiment.

FIG. 7 represents a flowchart illustrating an exemplary operation of the image processing apparatus 100 in FIG. 1. In accordance with the operation described in FIG. 7, the image processing apparatus 100 corrects an original image.

The image obtaining unit 101 first obtains the original image (S101). The reduced image generating unit 102 next reduces the original image to a reduced image (S102). The reduced image has fewer pixels than the original image. The correction value generating unit 103 then generates a first correction value for each of pixels in the reduced image, using a pixel value of the pixel in the reduced image and a pixel value of a surrounding pixel located around the pixel in the reduced image (S103).

The first enlarging unit 104 next generates a second correction value for each of pixels in a intermediate image, using information on the pixel in the intermediate image, information on a corresponding pixel included in the reduced image and corresponding to the pixel in intermediate image, and the first correction value of the corresponding pixel (S104). The intermediate image has more pixels than the reduced image and fewer pixels than the original image. For example, the intermediate image is obtained by reducing the original image.

Next, the second enlarging unit 105 generates a third correction value for each of the pixels in the original image, using the second correction value for the pixel in the intermediate image (S105). The amount of calculation for each of the pixels in the original image when the second enlarging unit 105 generates the third correction value is smaller than the amount of calculation for each of the pixels the intermediate image when the first enlarging unit 104 generates the second correction value. Then the image correcting unit 106 corrects the original image, using the third correction value for each of the pixels in the original image (S106).

In the above operation, the original image may be previously obtained. Hence the processing by the image obtaining unit 101 to obtain the original image may be omitted (S101). Then the image obtaining unit 101 does not have to be included in the image processing apparatus 100.

[Effects and So On]

In the embodiment, as described above, the image processing apparatus 100 corrects an original image. Furthermore, the image processing apparatus 100 includes the reduced image generating unit 102, the correction value generating unit 103, the first enlarging unit 104, the second enlarging unit 105, and the image correcting unit 106. The reduced image generating unit 102 reduces the original image to a reduced image. The reduced image has fewer pixels than the original image. The correction value generating unit 103 generates a first correction value for each of pixels in the reduced image, using a pixel value of the pixel in the reduced image and a pixel value of surrounding pixel located around the pixel.

The first enlarging unit 104 next generates a second correction value for each of pixels in an intermediate image, using information on the pixel in the intermediate image, information on a corresponding pixel included in the reduced image and corresponding to the pixel in the intermediate image, and the first correction value of the corresponding pixel. The intermediate image has more pixels than the reduced image and fewer pixels than the original image.

The second enlarging unit 105 generates a third correction value for each of the pixels in the original image, using the second correction value for the pixel in the intermediate image. Here the third correction value is generated with an amount of calculation for each of the pixels in the original image smaller than an amount of calculation for each of the pixels in the intermediate image in generating the second correction value. Then, the image correcting unit 106 corrects the original image, using the third correction value for each of the pixels in the original image.

Hence, the image processing apparatus 100 generates as many correction values as the pixels in the reduced image, and then increases the generated correction values for multiple times to generate as many correction values as the pixels in the original image. Here the image processing apparatus 100 utilizes increasing processing with a smaller amount of calculation per pixel as an image includes more pixels. Thus, the image processing apparatus 100 can achieve both reducing the processing amount and curbing possible image deterioration due to the reduction of the processing amount.

In the embodiment, for example, the first enlarging unit 104 generates the second correction value for each of the pixels in the intermediate image so that the second correction value gradually changes spatially along a direction in which a pixel value for the intermediate image gradually changes spatially. The first enlarging unit 104 generates the second correction value for each of the pixels in the intermediate image so that the second correction value steeply changes spatially along a direction in which the pixel value for the intermediate image steeply changes spatially.

Hence the image processing apparatus 100 can appropriately increase, with a small amount of processing, a correction value near an edge where a change in pixel value is steep. Hence the image processing apparatus 100 can curb image quality deterioration which occurs when a correction value is simply increased, contributing to a significant improvement in image quality.

Moreover, in the embodiment, the image processing apparatus 100 may include, for example, the first enlarging unit 104a as a modification of the first enlarging unit 104. The first enlarging unit 104a generates the second correction value for each of the pixels in the intermediate image by executing, on the first correction value for the pixel in the reduced image, n iterations (where n is an integer greater than or equal to 2) of generating processing. Here the generating processing is to generate, from a correction value for a pixel in a first image, a correction value for each of pixels in a second image which has more pixels than the first image.

Then, the first enlarging unit 104a may execute mth (where m is an integer greater than or equal to 2 and smaller than or equal to n) iteration of the generating processing so that an amount of calculation for each of the pixels in the second image in executing the mth iteration of the generating processing is smaller than an amount of calculation for each of the pixels in the second image in executing m-1th iteration of the generating processing.

Hence, when executing spatially intense smoothing, the image processing apparatus 100 can execute, with few pixels, generating processing in which processing amount per pixel is large. Consequently, the image processing apparatus 100 can curb an increase in the total processing amount, as well as execute intense smoothing, contributing to an improvement in image quality.

In the embodiment, for example, the first enlarging unit 104 generates the second correction value for each of the pixels in the intermediate image, using information on the corresponding pixel that is one of (i) a pixel at a position relatively co-located with a position of the pixel in the intermediate image, and (ii) a pixel located around the relatively co-located position.

Hence the image processing apparatus 100 can generate the correction value for each of the pixels in the intermediate image, using information on a pixel included in the reduced image and close to a pixel in the intermediate image.

In the embodiment, for example, the correction value generating unit 103 generates the first correction value through determination of the first correction value, using the pixel value of the pixel in the reduced image and the pixel value of the surrounding pixel and with reference to a two-dimensional lookup table. The two-dimensional lookup table defines the first correction value corresponding to the pixel value of the pixel in the reduced image and the pixel value of the surrounding pixel.

Hence the image processing apparatus 100 can generate an appropriate correction value for each of the pixels in the reduced image, using a pixel value of the pixel in the reduced image and a pixel value of a surrounding pixel located around the pixel in the reduced image.

In the embodiment, for example, the first enlarging unit 104 generates the second correction value for each of the pixels in the intermediate image, using a difference between a pixel value of the pixel in the intermediate image and a pixel value of the corresponding pixel included in the reduced image and corresponding to the pixel in the intermediate image. Furthermore, the first enlarging unit 104 generates the second correction value for each of the pixels in the intermediate image, using a distance between a relative position of the pixel in the intermediate image with respect to the intermediate image and a relative position of the corresponding pixel with respect to the reduced image.

Hence the image processing apparatus 100 can generate, in high accuracy, a correction value for each of the pixels in the intermediate image.

In the embodiment, for example, the first enlarging unit 104 generates the second correction value for each of the pixels in the intermediate image, using information on the pixel in the intermediate image, information on corresponding pixels included in the reduced image and corresponding to the pixel in the intermediate image, and the first correction value for each of the corresponding pixels.

In generating the second correction value, the first enlarging unit 104 determines a first weight for each of the corresponding pixels in accordance with a difference between a pixel value of the pixel in the intermediate image and a pixel value of the corresponding pixel. Furthermore, the first enlarging unit 104 determines a second weight for each of the corresponding pixels in accordance with a distance between (i) a relative position of the pixel in the intermediate image with respect to the intermediate image and (ii) a relative position of the corresponding pixel with respect to the reduced image. Then the first enlarging unit 104 determines a third weight for each of the corresponding pixels by combining the first weight and the second weight.

Then the first enlarging unit 104 generates the second correction value by weight-averaging, using the third weight and the first correction value of each of the corresponding pixels.

Hence the image processing apparatus 100 can generate, in high accuracy, a correction value for the intermediate image, by combining multiple weights.

In the embodiment, for example, the second enlarging unit 105 generates the third correction value for each of the pixels in the original image by one of bilinear interpolation, nearest-neighbor interpolation, and bicubic interpolation, using the second correction value for the pixel in the intermediate image.

Hence, based on a technique with a relatively small processing amount, the image processing apparatus 100 can generate the third correction value for each of the pixels in the original image from the second correction value for each of the pixels in the intermediate image. Hence the image processing apparatus 100 can reduce processing amount.

In the embodiment, for example, the image correcting unit 106 executes darkness correction by correcting the original image to increase brightness in a dark region of the original image.

Hence the image processing apparatus 100 can correct the original image according to a conversion characteristic similar to a visual characteristic of a human.

In addition, the image processing apparatus 100 may include any given constituent element described above, and the image processing method may include any given processing described above.

Furthermore, each of the above constituent elements may be a circuit. The circuits may form one circuit in all. Each of the circuits may be either a general-purpose one or a dedicated one.

Moreover, the above processing may be executed by a computer. For example, the computer executes the processing through execution of a program, using hardware resources such as a processor (CPU), a memory, and an input-output circuit. Specifically, the processing is executed by the processor obtaining data to be processed from the memory or the input-output circuit and processing the data, and outputting the processing result to the memory or the input-output circuit.

In addition, the program for executing the processing may be stored on a non-transitory computer-readable storage medium such as a CD-ROM. Here, the computer executes the processing by reading the program from the non-transitory storage medium and executing the program.

As described above, the embodiment is described as an example of a technique in the present disclosure. Accordingly, the drawings and detailed descriptions are provided.

Hence, the constituent elements in the detailed descriptions include not only ones mandatory to solve the problems. In order to describe the exemplary technique, a constituent element which is not mandatory to solve the problem could be included. Thus, when such a non-mandatory constituent element is found in the drawings and in the detailed descriptions, it shall not be immediately recognized that the non-mandatory constituent element is a mandatory one.

In addition, the embodiment is to exemplify a technique in the present disclosure. Hence the language in the embodiment may be subject to change, replacement, addition, and omission which are equivalent to and within the scope of the claims.

INDUSTRIAL APPLICABILITY

The present disclosure is applicable to an image processing method for correcting an original image. Specifically, the present disclosure is applicable to image processing apparatuses, such as a liquid crystal display, a blu-ray disc player, or a network player.

The invention claimed is:

1. An image processing method for correcting an original image, the method comprising:
   (a) reducing the original image to a reduced image having fewer pixels than the original image;
   (b) generating a first correction value for each of pixels in the reduced image, using a pixel value of the pixel in the reduced image and a pixel value of a surrounding pixel located around the pixel in the reduced image;
   (c) generating a second correction value for each of pixels in an intermediate image having more pixels than the reduced image and having fewer pixels than the original image, using information on the pixel in the intermediate image, information on a corresponding pixel included in the reduced image and corresponding to the pixel in the intermediate image, and the first correction value of the corresponding pixel;
   (d) generating a third correction value for each of pixels in the original image, using the second correction value for the pixel in the intermediate image; and
   (e) correcting the original image, using the third correction value for each of the pixels in the original image,
   wherein, in step (d), the third correction value is generated with an amount of calculation for each of the pixels in the original image smaller than an amount of calculation for each of the pixels in the intermediate image in generating the second correction value.

2. The image processing method according to claim 1,
   wherein, in step (c), the second correction value is generated for each of the pixels in the intermediate image so that (i) the second correction value gradually changes spatially along a direction in which a pixel value for the intermediate image gradually changes spatially, and (ii) the second correction value steeply changes spatially along a direction in which the pixel value for the intermediate image steeply changes spatially.

3. The image processing method according to claim 1,
   wherein, in step (c):
   the second correction value for each of the pixels in the intermediate image is generated by executing, on the first correction value for the pixel in the reduced image, n iterations (where n is an integer greater than or equal to 2) of generating processing of generating, from a correction value for a pixel in a first image, a correction value for each of pixels in a second image, the second image having more pixels than the first image; and mth (where m is an integer greater than or equal to 2 and smaller than or equal to n) iteration of the generating processing is executed so that an amount of calculation for each of the pixels in the second image in executing the mth iteration of the generating processing is smaller than an amount of calculation for each of the pixels in the second image in executing m-1th iteration of the generating processing.

4. The image processing method according to claim 1, wherein, in step (c), the second correction value is generated for each of the pixels in the intermediate image, using information on the corresponding pixel that is one of (i) a pixel at a position relatively co-located with a position of the pixel in the intermediate image, and (ii) a pixel located around the relatively co-located position.

5. The image processing method according to claim 1, wherein, in step (b), the first correction value is generated for each of the pixels in the reduced image through determination of the first correction value, using the pixel value of the pixel in the reduced image and the pixel value of the surrounding pixel and with reference to a two-dimensional lookup table defining the first correction value corresponding to the pixel value of the pixel in the reduced image and the pixel value of the surrounding pixel.

6. The image processing method according to claim 1, wherein, in step (c), the second correction value is generated for each of the pixels in the intermediate image, using (i) a difference between a pixel value of the pixel in the intermediate image and a pixel value of the corresponding pixel, (ii) a distance between a relative position of the pixel in the intermediate image with respect to the intermediate image and a relative position of the corresponding pixel with respect to the reduced image, and (iii) the first correction value of the corresponding pixel.

7. The image processing method according to claim 1, wherein, in step (c), the second correction value is generated for each of the pixels in the intermediate image, using information on the pixel in the intermediate image, information on corresponding pixels included in the reduced image and corresponding to the pixel in the intermediate image, and the first correction value for each of the corresponding pixels, the corresponding pixels including the corresponding pixel, and when generating the second correction value for each of the pixels in the intermediate image:

a first weight is determined for each of the corresponding pixels in accordance with a difference between a pixel value of the pixel in the intermediate image and a pixel value of the corresponding pixel;

a second weight is determined for each of the corresponding pixels in accordance with a distance between (i) a relative position of the pixel in the intermediate image with respect to the intermediate image and (ii) a relative position of the corresponding pixel with respect to the reduced image;

a third weight is determined for each of the corresponding pixels through combining the first weight and the second weight; and the second correction value is generated by weight-averaging, using the third weight and the first correction value of each of the corresponding pixels.

8. The image processing method according to claim 1, wherein, in step (d), the third correction value for each of the pixels in the original image is generated by one of bilinear interpolation, nearest-neighbor interpolation, and bicubic interpolation, using the second correction value for the pixel in the intermediate image.

9. The image processing method according to claim 1, wherein, in step (e), darkness correction is executed by correcting the original image to increase brightness in a dark region of the original image.

10. An image processing apparatus which corrects an original image, the image processing apparatus comprising:

a reducing unit configured to reduce the original image to a reduced image having fewer pixels than the original image;

a first generating unit configured to generate a first correction value for each of pixels in the reduced image, using a pixel value of the pixel in the reduced image and a pixel value of a surrounding pixel located around the pixel in the reduced image;

a second generating unit configured to generate a second correction value for each of pixels in an intermediate image having more pixels than the reduced image and having fewer pixels than the original image, using information on the pixel in the intermediate image, information on a corresponding pixel included in the reduced image and corresponding to the pixel in the intermediate image, and the first correction value of the corresponding pixel;

a third generating unit configured to generate a third correction value for each of pixels in the original image, using the second correction value for the pixel in the intermediate image; and a correcting unit configured to correct the original image, using the third correction value for each of the pixels in the original image, wherein the third generating unit is configured to generate the third correction value with an amount of calculation for each of the pixels in the original image smaller than an amount of calculation for each of the pixels in the intermediate image in generating the second correction value.

* * * * *